(No Model.)

A. REASON.
SHAFT COUPLING.

No. 496,063. Patented Apr. 25, 1893.

Witnesses
Harry L. Amer.
L. P. Walhaupter.

Inventor
Albert Reason,
By his Attorneys,
C. A. Snow & Co.

UNITED STATES PATENT OFFICE.

ALBERT REASON, OF PINCKNEY, MICHIGAN.

SHAFT-COUPLING.

SPECIFICATION forming part of Letters Patent No. 496,063, dated April 25, 1893.

Application filed December 27, 1892. Serial No. 456,393. (No model.)

*To all whom it may concern:*

Be it known that I, ALBERT REASON, a citizen of the United States, residing at Pinckney, in the county of Livingston and State of Michigan, have invented a new and useful Shaft-Coupling, of which the following is a specification.

This invention relates to shaft couplings; and it has for its object to provide an improved flexible shaft coupling, which, while allowing a shaft to be indefinitely extended, at the same time provides such a coupling between the shaft sections, that such shaft sections can be arranged at any angle or in any manner and still have a steady rotation together with the other shaft sections, and thereby providing a coupling which not only dispenses with belting and gearing, but at the same time provides a universal joint for shafts, thus dispensing with the old knuckles and ball joints.

With these and other objects in view which will readily appear as the nature of the invention is better understood, the same consists in the novel construction, combination and arrangement of parts hereinafter more fully described, illustrated and claimed.

Figure 1:
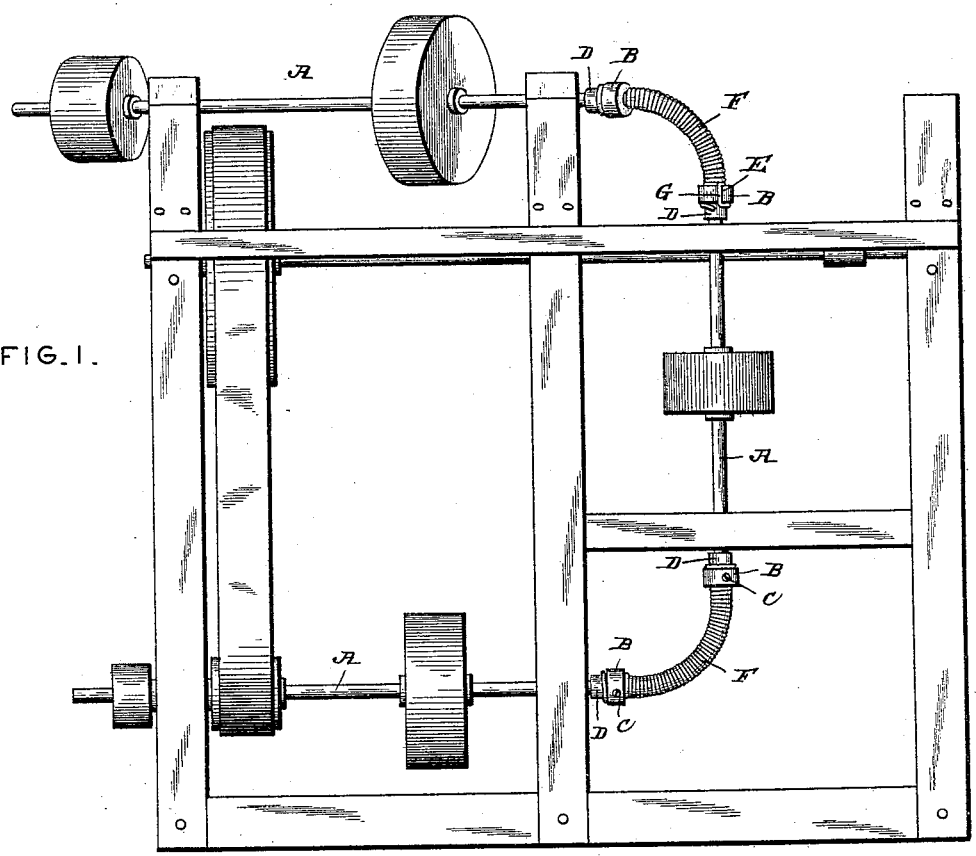
Figure 2:
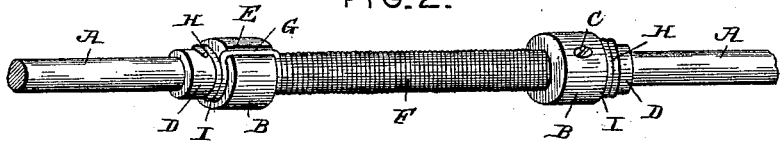
Figure 3:
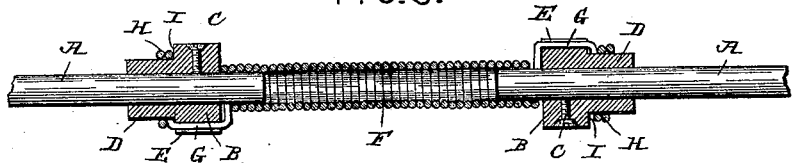

In the accompanying drawings:—Figure 1 is a plan view of a line of shafting, the several sections of which are coupled by my improved flexible coupling. Fig. 2 is an enlarged detail in perspective of a coupling. Fig. 3 is an enlarged detail sectional view of the same.

Referring to the accompanying drawings, A represents the shaft sections of a line of shafting, adapted to be coupled together by the improvement herein described, and by reason of such connection adapted to be arranged at any angle, or disposed in any position, as illustrated in Fig. 1 of the drawings.

The adjacent ends of the shaft sections A, to be coupled together, are designed to removably receive the coupling collars B. The coupling collars B, are slipped on the shaft sections, in from their ends which project slightly beyond said collars, and the latter are held firmly, though removably, in position by the set screws C, passing therethrough and impinging on the shaft section. The collars B, are provided at their inner sides with the reduced necks D, from which lead the edge grooves E, cutting the edges of the collars.

Arranged between the adjacent shaft ends and the removable collars thereon are the flexible coil coupling springs F. The flexible coil coupling springs F, are made of any suitable wire or metal and in any strength according to the special use of such spring, and the same are wound or coiled in a direction corresponding to the direction of rotation of the shaft, the sections of which they connect. The opposite ends of the springs F, take over the projecting portions of the shaft sections A, beyond the collars, and are provided at such ends with the extended straight portions G, which take into the edge grooves E, of the collars, and which terminate at their outer ends in the off-standing auxiliary retaining coils H, which embrace the reduced necks D, of the collars, and are necessarily held fast against the shoulders I, formed at the base of said necks. By this attachment or connection of the spring ends to the coupling collars, the said coupling springs are connected securely to the shaft sections so that there is no danger whatever of slipping or disarrangement of the coupling.

A new spring can be readily placed in position by removing the collars, as will be apparent, and it will of course be understood that the said spring coupling can be used in connection with any line of shafting or machine.

Changes in the form, proportion and the minor details of construction may be resorted to without departing from the principle or sacrificing any of the advantages of this invention.

Having thus described my invention, what I claim, and desire to secure by Letters Patent, is—

1. In a flexible shaft coupling, the combination, with adjacent shaft ends; of coupling collars removably clamped on said shaft ends and provided with reduced necks D, extended from their inner sides, and a flexible coil coupling spring arranged between said shaft ends and provided with off-standing auxiliary retaining coils at its ends adapted to embrace the reduced necks of said collars and to be drawn against the body of the latter, substantially as set forth.

2. In a flexible shaft coupling, the combination, with adjacent shaft ends; of coupling collars removably clamped on said shaft ends and provided with reduced necks at their inner sides, forming shoulders at the base thereof, and edge grooves leading from said necks, and a flexible coil coupling spring arranged between the shaft ends and provided with extended straight portions fitting said edge grooves, and retaining coils at the terminals of said straight portions and embracing said reduced necks in front of said shoulders, substantially as set forth.

In testimony that I claim the foregoing as my own I have hereto affixed my signature in the presence of two witnesses.

ALBERT REASON.

Witnesses:
G. W. TEEPLE,
R. H. TEEPLE.